(12) United States Patent
Hagen

(10) Patent No.: US 7,538,979 B2
(45) Date of Patent: May 26, 2009

(54) FLEXURE INCLUDING CONTROLLED STATIC ATTITUDE AND LOAD POINT CONTACT

(75) Inventor: Tracy Michael Hagen, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 478 days.

(21) Appl. No.: 11/368,931

(22) Filed: Mar. 6, 2006

(65) Prior Publication Data

US 2007/0206328 A1    Sep. 6, 2007

(51) Int. Cl.
*G11B 5/48* (2006.01)

(52) U.S. Cl. .................................... 360/245.3

(58) Field of Classification Search ............. 360/245.3, 360/323, 245.4, 294.4
See application file for complete search history.

(56) References Cited

U.S. PATENT DOCUMENTS

| 5,014,144 | A | * | 5/1991 | Sato et al. | 360/245.3 |
| 5,923,500 | A |   | 7/1999 | Hagen | 360/104 |
| 5,973,884 | A |   | 10/1999 | Hagen | 360/104 |
| 6,069,773 | A |   | 5/2000 | Frater et al. | 360/104 |
| 6,246,547 | B1 |  | 6/2001 | Bozorgi et al. | 360/245.3 |
| 6,397,455 | B1 |  | 6/2002 | Hagen | 29/603.03 |
| 6,445,546 | B1 |  | 9/2002 | Coon | 360/245.7 |
| 6,856,487 | B1 | * | 2/2005 | Mei et al. | 360/244.8 |
| 7,057,856 | B2 | * | 6/2006 | Bonin et al. | 360/245.3 |
| 7,489,477 | B1 | * | 2/2009 | Padeski | 360/245.7 |
| 2002/0034051 | A1 |  | 3/2002 | Hagen | 360/245.3 |
| 2002/0154448 | A1 | * | 10/2002 | Kasajima et al. | 360/245.3 |
| 2004/0125510 | A1 | * | 7/2004 | Yang et al. | 360/294.4 |
| 2005/0099732 | A1 | * | 5/2005 | Bonin et al. | 360/245.3 |
| 2005/0099733 | A1 |  | 5/2005 | Hagen | 360/245.7 |
| 2006/0181810 | A1 | * | 8/2006 | Nakamura et al. | 360/245.3 |
| 2006/0227464 | A1 | * | 10/2006 | Huang et al. | 360/245.3 |
| 2006/0274451 | A1 | * | 12/2006 | Arya | 360/245.3 |
| 2006/0274452 | A1 | * | 12/2006 | Arya | 360/245.3 |
| 2006/0274453 | A1 | * | 12/2006 | Arya | 360/245.3 |
| 2008/0002302 | A1 | * | 1/2008 | Kwon et al. | 360/245.3 |

* cited by examiner

*Primary Examiner*—Allen T Cao
(74) *Attorney, Agent, or Firm*—Leanne Taveggia Farrell; Westman, Champlin & Kelly, P.A.

(57) ABSTRACT

A flexure includes a base and a pair of beams coupled to the base at fixed-ends. The pair of beams are joined by a cross-beam at free-ends of the beams. A tongue extends from the cross-beam between the pair of beams towards the base. The flexure also includes a bend in each of the beams, which displaces the free ends out-of-plane relative to the fixed ends.

20 Claims, 7 Drawing Sheets

FLEXURE INCLUDING CONTROLLED STATIC ATTITUDE AND LOAD POINT CONTACT

FIELD OF THE DISCLOSURE

The disclosure relates generally to flexures, and more particularly but not by limitation to flexures for data storage systems.

BACKGROUND OF THE DISCLOSURE

A typical data storage system includes a housing that encloses a variety of components. For example in a disc drive, the components include at least one rotating disc having data on one or more surfaces that are coated with a medium for storage of digital information in a plurality of circular, concentric data tracks. The disc(s) are mounted on a spindle motor that causes the disc(s) to spin and the data surfaces of the disc(s) to pass under respective hydrodynamic bearing slider surfaces. The sliders carry transducers, which write information to and read information from the data surfaces of the disc(s). An actuator mechanism moves the sliders from track to track across the surfaces of the discs under control of electronic circuitry. The actuator mechanism includes a track accessing arm and a suspension for each slider. The suspension includes a load beam and a gimbal (or flexure). The load beam provides a preload force, which forces the slider toward the disc surface. The gimbal is configured to couple the head to the load beam. Therefore, the gimbal is positioned between the slider and the load beam, or is integrated in the load beam, to provide a resilient connection that allows the slider to pitch and/or roll while following the topography of the disc.

The preload force, provided by the load beam, applies a force on the slider at a load point. Generally, the load point is located such that the preload force is applied to the slider through a feature such as a dimple or hemispherical radius formed in the gimbal or load beam. The preload force counteracts the lifting force from the slider's hydrodynamic bearing surface. Precise control of the preload force results in a slider that will fly above the disc(s) at a desired fly height (or contact the disc surface with a desired contact force in direct-contact or pseudo-contact applications).

As disc drives continue to be improved, there is a desire to increase performance while decreasing size and manufacturing costs. As a result, the size of the suspension assembly that provides the electrical and mechanical interconnection between the slider and the actuator mechanism has also been reduced. Improving performance and reducing costs are conflicting objectives and, therefore, can be difficult to achieve.

One of the most common suspension assembly issues is the position of the slider relative to the medium. Vertical separation between slider and the data track on the medium is one type of position issue. If the slider is too far above the data track the electromagnetic interaction between the slider and the medium will be weak, resulting in poor data storage. If the slider is too close to the medium then mechanical contact between the slider and the spinning medium can become too frequent, or too severe, or both, (for non-contact applications) thereby affecting the reliability of the disc drive. Poor vertical separation between the slider and the medium can be the result of deviations of the load force applied by the load beam. Besides deviations in load force, poor vertical separation between the slider and the medium can be the result of the suspension failing to present the bearing surface of the slider in a parallel fashion to the surface of the medium. If the bearing surface of the slider is not parallel to the surface of the disk when the head is presented, then the gimbal will deflect in order to allow the slider to comply with the medium. This gimbal deflection results in moments, or torques, opposing the deflection. These moments can be developed from either pitch rotation of the gimbal, or roll rotation of the gimbal, or both.

The mechanical integrity of the suspension is another factor that can affect the positioning of slider. Specifically, shock and vibration can be the most serious. Small sized disc drives that are mounted in portable consumer devices (e.g., notebook computers and portable music players and other types of devices) are especially susceptible to shock and vibration. It is fairly easy to accidentally drop a disc drive or the system in which it is mounted. Such accidental drops can cause significant shock pulses to pass through the various components within the disc drive and can cause the slider to lift away from the medium, and then crash back against the medium causing severe damage to the medium, head, or both. Furthermore, during the lifting period of the shock event, the slider can sometimes separate away from suspension. Such separation can deform and damage the gimbal.

A need exists for an improved design of suspension assemblies for sliders that ensures sufficient load point contact force and control of pitch and roll static angles independent of the load point contact force.

Embodiments of the present invention provide solutions to these and/or other problems and offer other advantages over the prior art.

SUMMARY

A suspension assembly is provided having a load member, a flexure and a slider. The flexure is coupled to the load member and includes a longitudinal axis. The flexure includes a base centered about the longitudinal axis and a pair of beams coupled to the base at fixed-ends on opposing sides of the longitudinal axis and joined by a cross-beam at free-ends of the beams. A tongue extends from the cross-beam along the longitudinal axis between the pair of beams towards the base. The slider is coupled to the tongue. A bend is positioned across each of the beams, transversely to the longitudinal axis, which displaces the free ends relative to the base.

Other features and benefits that characterize embodiments of the present invention will be apparent upon reading the following detailed description and review of the associated drawings.

BRIEF DESCRIPTION OF THE DRAWINGS

FIG. 6-1 illustrates a load function of a gimbal beam when analyzing gimbal beams as cantilever beams.

FIG. 6-2 illustrates a shear function of a gimbal beam when analyzing gimbal beams as cantilever beams.

FIG. 6-3 illustrates a moment function of a gimbal beam when analyzing gimbal beams as cantilever beams.

FIG. 6-4 illustrates a slope function of a gimbal beam when analyzing gimbal beams as cantilever beams.

FIG. 6-5 illustrates a deflection function of a gimbal beam when analyzing gimbal beams as cantilever beams.

FIG. 11-1 illustrates a transverse bend in a gimbal beam in accordance with an embodiment of the present invention.

FIG. 11-2 illustrates a pair of transverse bends in a gimbal beam in accordance with an embodiment of the present invention.

DETAILED DESCRIPTION OF ILLUSTRATIVE EMBODIMENTS

Figure 1:
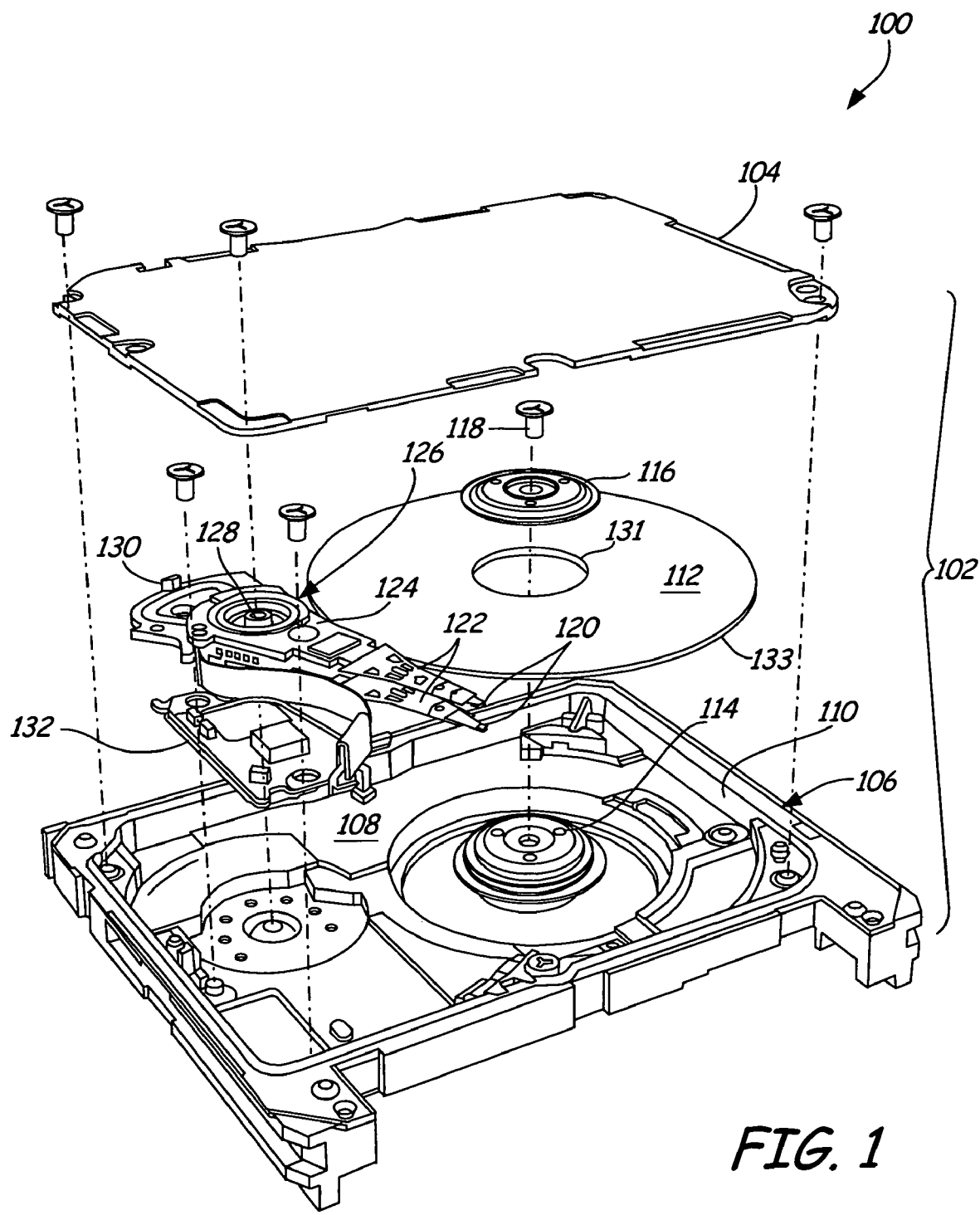
FIG. 1 illustrates an exploded perspective view of a data storage system.

FIG. 1 is an exploded perspective view of a disc drive 100 in which embodiments of the present invention are useful. Disc drives are common data storage systems. One or more embodiments of the present invention are also useful in other types of data storage and non-data storage systems.

Disc drive 100 includes a housing 102 having a cover 104 and a base 106. As shown, cover 104 attaches to base 106 to form an enclosure 108 enclosed by a perimeter wall 110 of base 106. The components of disc drive 100 are assembled to base 106 and are enclosed in enclosure 108 of housing 102. As shown, disc drive 100 includes a disc or medium 112. Although FIG. 1 illustrates medium 112 as a single disc, those skilled in the art should understand that more than one disc can be used in disc drive 100. Medium 112 stores information in a plurality of circular, concentric data tracks and is mounted on a spindle motor assembly 114 by a disc clamp 116 and pin 118. Spindle motor assembly 114 rotates medium 112 causing its data surfaces to pass under respective hydrodynamic bearing slider surfaces. Each surface of medium 112 has an associated slider 120, which carries transducers that communicate with the surface of the medium.

In the example shown in FIG. 1, sliders 120 are supported by suspension assemblies 122, which are, in turn, attached to track accessing arms 124 of an actuator mechanism 126. Actuator mechanism 126 is rotated about a shaft 128 by a voice coil motor 130, which is controlled by servo control circuitry within internal circuit 132. Voice coil motor 130 rotates actuator mechanism 126 to position sliders 120 relative to desired data tracks, between a disc inner diameter 131 and a disc outer diameter 133.

Figure 2:
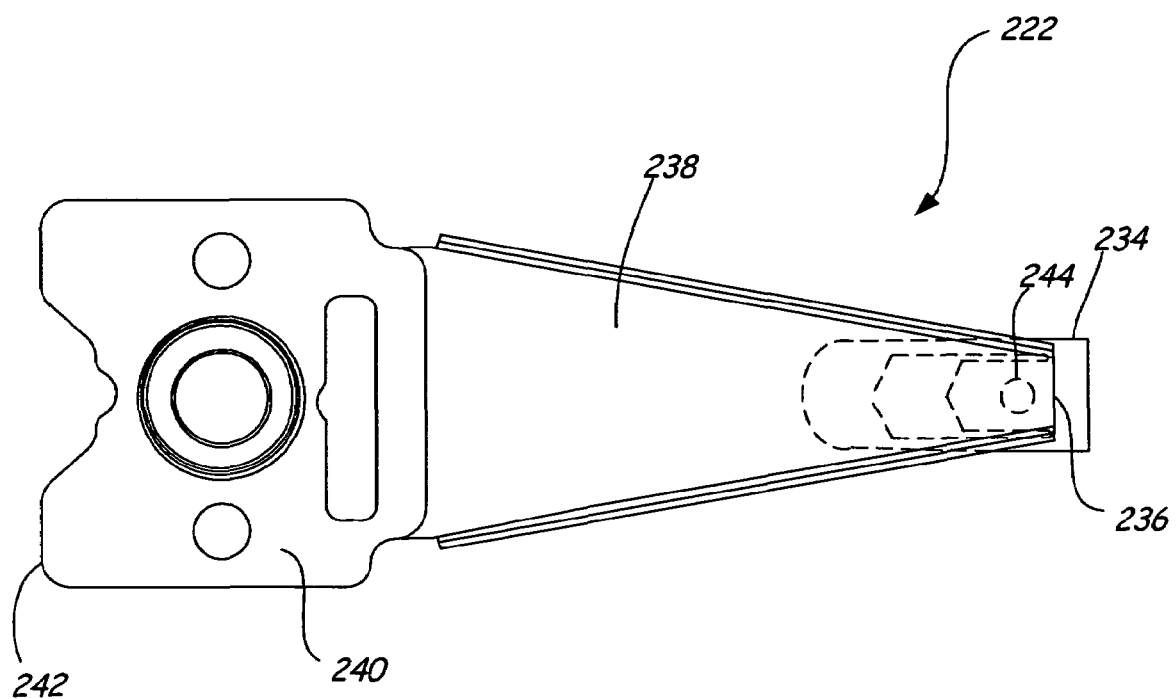
FIG. 2 illustrates a top plan view of a suspension assembly with which embodiments of the present invention are useful.

FIG. 2 is a top plan view of a suspension assembly in which embodiments of the present invention are useful. Suspension assembly 222 includes a flexure or gimbal 234 (shown partially in dashed lines) positioned at a distal end 236 of the suspension assembly, a load beam 238 and a mounting plate 240 positioned at a proximal end 242 of the suspension assembly. Gimbal 234 provides the mechanical connection between the slider (not illustrated in FIG. 2) and load beam 238. Although FIG. 2 illustrates gimbal 234 as a separate component from load beam 238, it should be noted that gimbal 234 can be formed integrally with load beam 238. Load beam 238 provides a preload force (as discussed in FIG. 1) that urges the slider towards the spinning medium. The preload force is applied at a load point 244. The load point is the point or localized area at which the load force is transferred from the load beam to the slider, through gimbal 234. Typically the load point is defined by a load protrusion, such as a hemispherical dimple, which can be formed in either the gimbal 234 or the load beam 238. In one embodiment, the dimple is formed in gimbal 234. Mounting plate 240 provides the mechanical connection between load beam 238 and a track accessing arm of an actuator mechanism, such as track accessing arm 124 of actuator mechanism 126 in FIG. 1. For purposes of simplification, electrical conductors are not shown. Electrical conductors can include a miniature flexible circuit or trace conductors. Other forms of providing electrical conductors are possible.

A slider employs self-acting hydrodynamic bearings to reduce the friction between the slider and medium. The bearing causes the recording head to fly above or in close proximity to the medium. Suspension assembly 222 plays an important role in controlling the nominal flying height (or the force at which the head contacts the medium in direct-contact applications), and makes significant contributions to the variation in flying height (or contact force). The primary function of load beam 238 is to supply a preload force onto the recording head that counteracts the lifting force from the slider's hydrodynamic bearing surface. If the load force is controlled properly then the slider will fly above the medium at the desired flying height.

Figure 3:
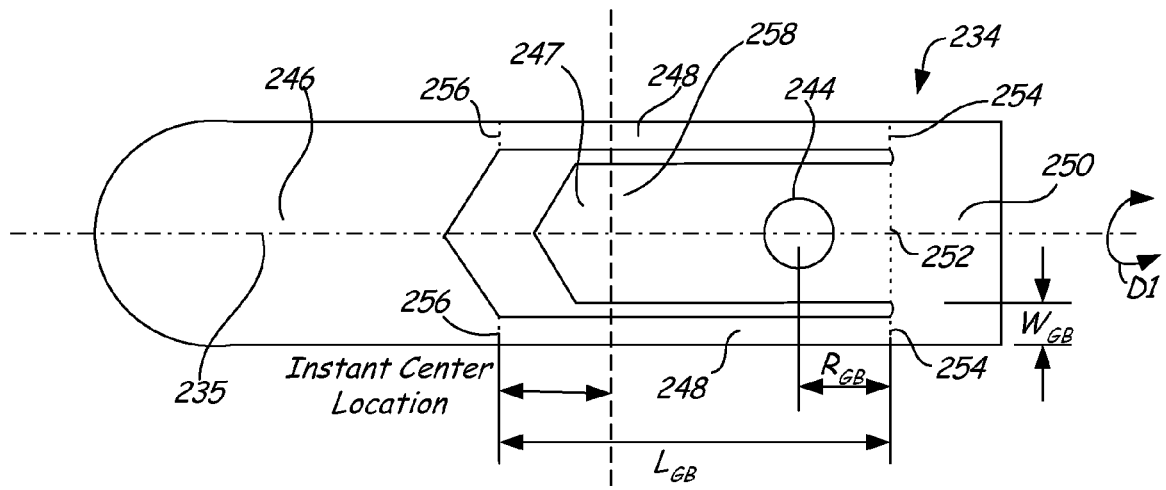
FIG. 3 illustrates a more detailed plan view of a gimbal illustrated in FIG. 2.

FIG. 3 illustrates a more detailed view of gimbal 234 illustrated in FIG. 2 for use with embodiments of the present invention. Although gimbal 234 is shown as a separate component from load beam 238, it should be recognized that gimbal 234 can be integrally formed or be a single continuous piece of a material with load beam 238. In addition, it should be noted that the present invention is not limited to a gimbal shape as illustrated in FIG. 3. Other gimbal shapes are contemplated by the present invention.

Gimbal 234 includes a longitudinal axis 235, a base 246 centered about the longitudinal axis, a gimbal tongue 247, a pair of gimbal beams 248, a flexible cross-beam 250 and a load point 244. The pair of gimbal beams 248 are slender, flexible beams that are positioned on opposing sides of gimbal tongue 247 and have a length ($L_{GB}$) and a width ($W_{GB}$). The pair of gimbal beams 248 are located on each side of longitudinal axis 235 and include free-ends 254 and fixed-ends 256. Flexible cross-beam 250 extends transversely to longitudinal axis 235 and connects a first end 252 of gimbal tongue 247 to free-ends 254 of the pair of gimbal beams 248. Gimbal tongue 247 extends along longitudinal axis 235 from first end 252 towards base 246. Gimbal tongue 247 is configured to attach to a slider of a suspension assembly using an attachment mechanism, such as adhesive. Base 246 is connected to fixed-ends 256 of the pair of gimbal beams 248 and configured to attach to a load beam of a suspension assembly using an attachment mechanism, such as a plurality of laser spot welds. Load point 244 is positioned on gimbal tongue 247 a distance ($R_{GB}$) from free-ends 254 of gimbal beams 248. Although FIG. 3 illustrates load point 244 formed on gimbal tongue 247 of gimbal 234, it should be understood that load point 244 can alternatively be formed on load beam 238 (FIG. 2).

Figure 4:
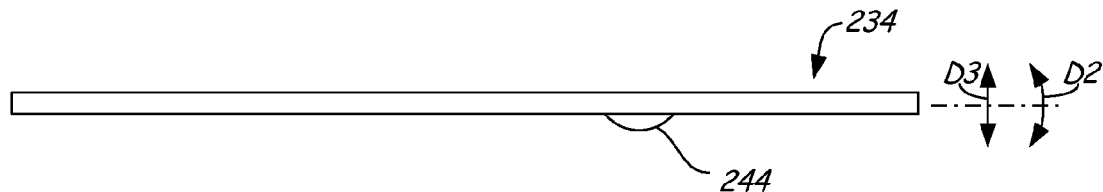
FIG. 4 illustrates a side view of the gimbal illustrated in FIG. 3.
Figure 5:
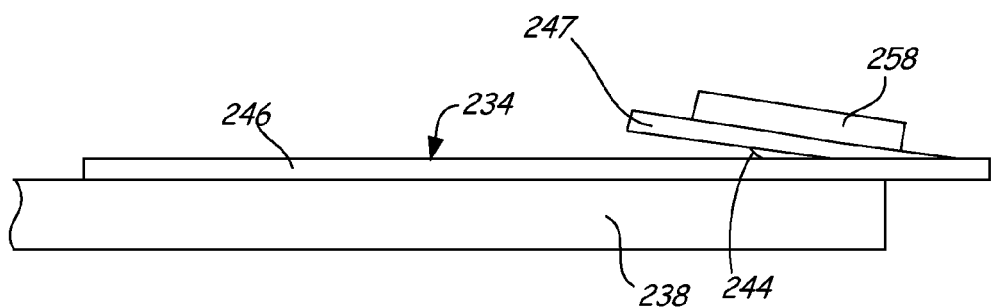
FIG. 5 illustrates a side view of the gimbal illustrated in FIG. 3 as assembled to components of the suspension assembly of FIG. 2.

FIGS. 4 and 5 illustrate side views of gimbal 234 of FIG. 3. FIG. 4 illustrates a side view of gimbal 234 prior to assembly to components of a suspension assembly, while FIG. 5 illustrates a side view of gimbal 234 after it is assembled to components of a suspension assembly. As shown in FIG. 5, the base 246 of gimbal 234 is attached to load beam 238 such that the apex of the dimple that forms load point 244 faces and is in contact with load beam 238. This displaces gimbal tongue 247 from the plane of base 246. Slider 258 is attached to the surface of gimbal tongue 247 that is opposite to load beam 238. Thus, load point 244 transfers the preload force from load beam 238 onto slider 258. It should be noted that in this example, the load protrusion has the geometrical shape of a hemispherical dimple. Other geometrical shapes can also be used in alternative embodiments, and the protrusion can be formed by material deformation, material removal or material addition, for example.

To provide the slider with sufficient freedom to follow the topography of the spinning medium, gimbal 234 includes a relatively low stiffness in a pitch direction D1 (illustrated in FIG. 3) and a roll direction D2 (illustrated in FIG. 4) of the slider, and relatively low stiffness in a vertical direction D3 (illustrated in FIG. 4) of load beam 238. Gimbal 234 includes a low stiffness material, such as a thin metal foil of 300 series stainless steel. Such a material allows the gimbal to easily pitch and roll to follow the topography of the medium. Unfortunately, a low stiffness material causes the gimbal to be fragile and therefore prone to damage. Damage to the structure of gimbal 234 from vibrational shock events commonly includes load point separation and deformation of the gimbal features, such as gimbal beams 248. Load point separation is a condition observable in the assembly of a suspension assembly 233 and/or assembly of slider 258 to the suspension assembly when load point 244 is no longer in contact with the flat surface of the slider 258. Deformed gimbal features is a condition observable in manufacture when the gimbal has been damaged enough to affect the static pitch angle, or the static roll angle, or both.

Load point separation can be thought of as a failure mode; that is, it is a condition that is present or is not present. Severely deformed gimbals can be observed visually, while slightly deformed gimbals are determined by pitch static angle or roll static angle outside the normal distribution of static angle values. Due to the fragility of gimbal 234, the normal distribution of static angle values can be excessively broad. Consequently, a manufacturing process can incorporate inspection systems to measure and accept or reject suspension assemblies during assembly and/or sliders during assembly based on static angle values. The rejection rate of suspension assemblies during assembly and sliders during assembly based on static angle values can be unfavorably great. Therefore, manufacturing process can incorporate an automatic restoration device within the static angle inspection system. The restoration device delicately deflects gimbal 234 in pitch and/or roll directions as determined by the original measurement of static angles. A computer calculates the amount of deflection to apply such that the post-deflection inspection of static pitch angle and static roll angle are closer to the desired nominal target, thereby improving the manufacturing process material yield.

There are two types of static angle restoration devices. The first kind of device uses mechanical means to deflect the gimbal. The mechanical system consists of tiny clamps that grip the gimbal beams and deflect the beams as required by a codified algorithm. Since smaller sized disc drives and, accordingly, smaller suspension assemblies are becoming increasingly popular, a second kind of restoration device uses laser energy. Laser energy can permanently change gimbal static angles by quickly melting the skin of the gimbal material at a point or points along the length of the gimbal beam(s) 248. The area melted by the laser cools and solidifies in a manner that introduces some residual stress. Residual stress creates a local bending moment, and the bending moment causes angular deflection of the gimbal tongue in the pitch direction, roll direction, or both.

Ideally the static angle restoration process should favorably affect the pitch static angle and roll static angles, and not unfavorably affect other important suspension characteristics. An example of an important suspension characteristic that can be easily affected by the static angle restoration process is load point contact force. It is possible to reduce load point contact force such that the load point separates from the flat surface of the slider it is intended to be in contact with. The frequency of occurrence of load point separation from the static angle restoration process is increased when the amount of load point contact force between the gimbal and load beam is low or the angular deflection of one or both gimbal beams during the restoration process is in a direction that reduces load point contact force.

Nominal load point contact force is a product of the out-of-plane stiffness of gimbal 234 measured between load point 244 and base 246, and the out-of-plane deflection. Out-of-plane deflection of the gimbal is created by load point 244 pressing against the loaded surface of load beam 238 (or gimbal 234), depending on whether the load point is on gimbal 234 (or load beam 238). Load point contact force can be further increased by forming gimbal 234 in such a manner as to create even greater out-of-plane deflection. Unfortunately, such forming can result in unfavorable pitch static angle values, and subsequent restoration efforts to correct pitch static angle reduces load point contact force. The extent of these interactions is determined by the location and amount of forming on gimbal 234. A further problem with this approach is that the deflection angle distribution can be unfavorably wide due to, for example, variation in yield strength or variation in metal thickness. Thus, in addition to the possibility of creating an unfavorable pitch static angle value on an individual suspension assembly, gimbal deformation may also create an unfavorable increase to the variation in pitch static angle across a population of suspension assemblies and provisions for restoration of pitch and roll static angles at the suspension level that do not degrade the ability to perform restoration at the recording head assembly level.

Embodiments of the present invention provide an increased load point contact force, provide control of pitch and roll static angles independent of the load point contact force, and provide provisions for restoration of pitch and roll static angles at the suspension level that do not degrade the ability to perform restoration at the slider level. All of these characteristics aid in controlling the positioning of the slider relative to a medium. In order to better understand how embodiments of the present invention provide these characteristics, an appreciation of the theoretical out-of-plane deflection behavior of gimbal 234 can be useful. Gimbal beams 234, subject to out-of-plane deflection relative to gimbal tongue 247, can be modeled as cantilever beams subject to a load force and a moment load. When modeling gimbal beams 234 as cantilever beams, the gimbal beams are assumed to have section properties constant with respect to their length. In addition, it is assumed that the gimbal is made entirely from stainless steel foil and lacking a dielectric layer and a copper conducting layer. However, one skilled in the art can take the teaching of the example illustrated in FIG. 3 and readily apply it to gimbals with varying section properties and/or having dielectric layers, copper conducting layers or other layers. In addition, for illustrative purposes, it is assumed that gimbal tongue 247, cross-beam 250, and base

246 are rigid. Again, one skilled in the art can apply these teachings to gimbals where these components have known flexibility.

Cantilever beams can be analyzed by using beam theory relationships. These relationships are:

$$\text{Load} = \frac{d(\text{Shear})}{dx}$$

$$\text{Shear} = \frac{d(\text{Moment})}{dx}$$

$$\frac{\text{Moment}}{EI} = \frac{d(\text{Slope})}{dx}$$

$$\text{Slope} = \frac{d(\text{Deflection})}{dx}$$

where E is the modulus of elasticity of the gimbal material and I is the bending moment of inertia.

Figures 1, 6:
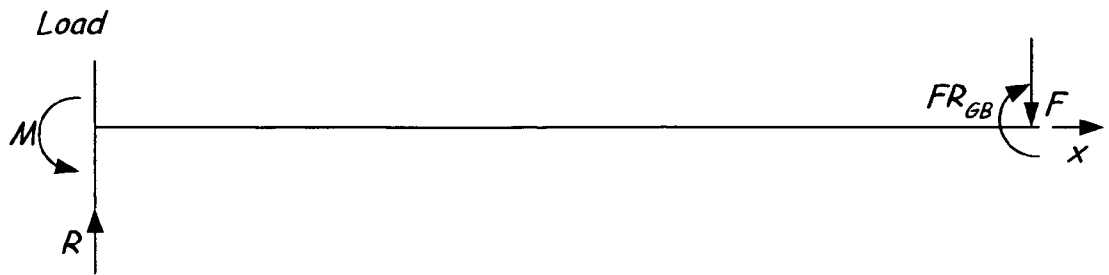
Figures 2, 6:
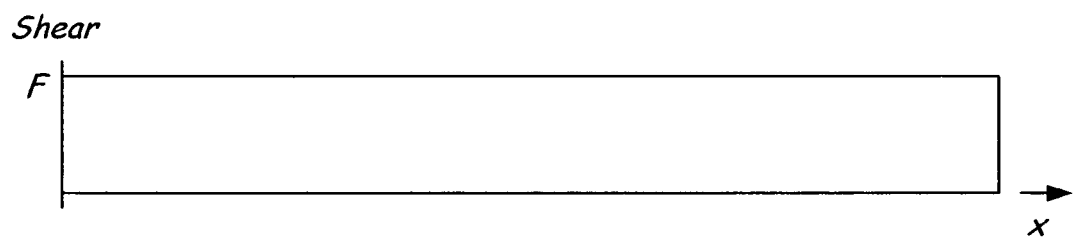
Figures 3, 6:
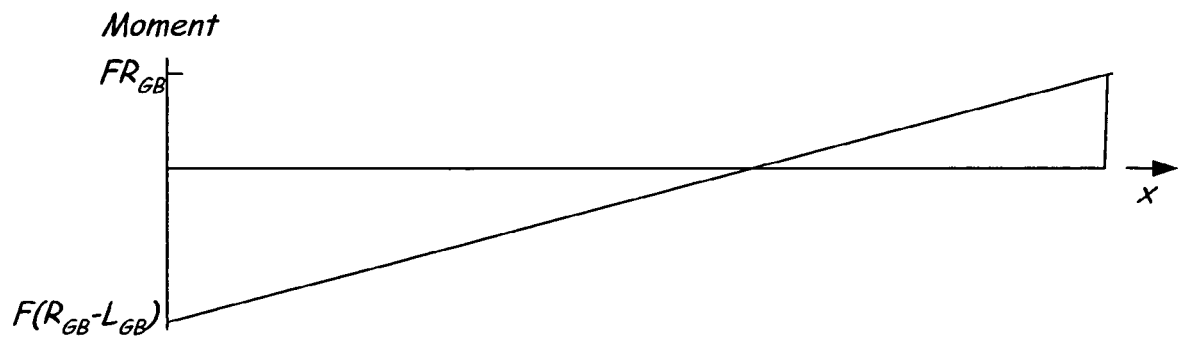
Figures 4, 6:
Figures 5, 6:
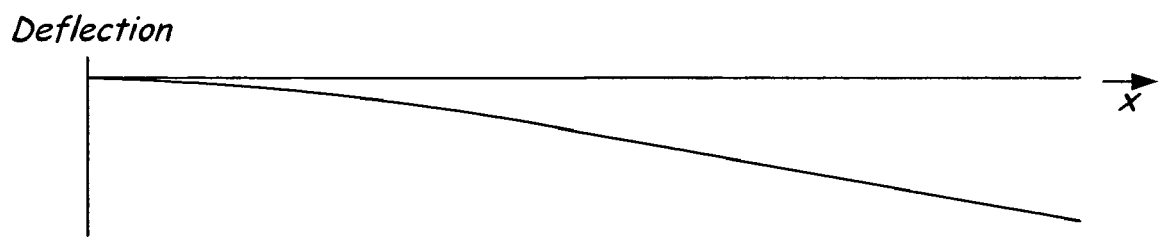

FIGS. 6-1 and 6-2 illustrate a load function and a shear function of gimbal beam 248, where M is the moment at fixed-end 256 of gimbal beam 248, R is the resultant force component at fixed-end 256 of gimbal beam 248, F is the load force exerted on gimbal 234 by load beam 222, $R_{GB}$ is the distance from load point 244 to free-end 254 of gimbal beam 248, $FR_{GB}$ is the initial condition of moment at free-end 254 of gimbal beam 248. FIG. 6-3 illustrates a moment function of gimbal beam 248, where $L_{GB}$ is the length of gimbal beams 248.

For gimbal beams 248 having constant section with respect to length the M/EI function has an identical shape to the M function. Integrating the M/EI function provides the slope function, and integrating the slope function provides the displacement function. These relationships are illustrated in FIGS. 6-4 and 6-5. To obtain slope as a function of x, integrate M/EI as follows:

$$\text{Slope} = \int \frac{M}{EI} dx$$

$$= \int_0^{L_{GB}} \frac{F}{EI}(x - L_{GB} + R_{GB}) dx$$

$$= \frac{F}{EI}\left(\frac{x^2}{2} + \frac{(R_{GB} - L_{GB})}{2}x\right)$$

To obtain deflection as a function of x, Integrate slope as follows:

$$\text{Deflection} = \int_0^{L_{GB}} \frac{F}{EI}\left(\frac{x^2}{2} + (R_{GB} - L_{GB})x\right) dx$$

$$= \frac{F}{EI}\left(\frac{x^3}{6} + \frac{(R_{GB} - L_{GB})}{2}x^2\right)$$

The slope at free-end 254 of gimbal beam 248 (which is identical to the slope of gimbal tongue 247) is:

$$\text{Slope} = \frac{F}{EI}\left(\frac{x^2}{2} + (R_{GB} - L_{GB})x\right)$$

-continued $$= \frac{F}{EI}\left(\frac{L_{GB}^2}{2} + (R_{GB} - L_{GB})L_{GB}\right)$$

$$= \frac{F}{EI}\left(R_{GB}L_{GB} - \frac{L_{GB}^2}{2}\right)$$

From inspection, it is shown that when $R_{GB}$ is equal to $L_{GB}/2$ the change in slope will be zero. The deflection at free-end 254 of gimbal beam 248 is as follows:

$$\text{Deflection} = \frac{F}{EI}\left(\frac{L_{GB}^3}{6} + \frac{(R_{GB} - L_{GB})}{2}L_{GB}^2\right)$$

$$= \frac{F}{EI}\left(\frac{L_{GB}^3}{6} + \frac{R_{GB}L_{GB}^2}{2} - \frac{L_{GB}^3}{2}\right)$$

$$= \frac{F}{EI}\left(\frac{R_{GB}L_{GB}^2}{2} - \frac{L_{GB}^3}{3}\right)$$

The deflection at load point 244 is equal to the deflection at free-ends 254 of gimbal beam 248 less the product of slope at free-end 254 of gimbal beams 248 and the distance ($R_{GB}$) from load point 244 to free-end 254 is as follows:

$$\text{Deflection} = \frac{F}{EI}\left(\frac{R_{GB}L_{GB}^2}{2} - \frac{L_{GB}^3}{3}\right) - \frac{F}{EI}\left(R_{GB}L_{GB} - \frac{L_{GB}^2}{2}\right)R_{GB}$$

$$= \frac{F}{EI}\left(\frac{R_{GB}L_{GB}^2}{2} - \frac{L_{GB}^3}{3} - R_{GB}^2 L_{GB} + \frac{R_{GB}L_{GB}^2}{2}\right)$$

$$= \frac{F}{EI}\left(R_{GB}L_{GB}^2 - \frac{L_{GB}^3}{3} - R_{GB}^2 L_{GB}\right)$$

The gimbal out-of-plane spring rate at load point 244 is as follows:

$$k_{Vertical, Load\ Point} = \frac{EI}{\frac{L_{GB}^3}{3} + R_{GB}^2 L_{GB} - R_{GB}L_{GB}^2}$$

And by expanding the moment of inertia term:

$$k_{Vertical, Load\ Point} = \frac{E(2W_{GB})T_{GB}^3}{12\left(\frac{L_{GB}^3}{3} + R_{GB}^2 L_{GB} - R_{GB}L_{GB}^2\right)}$$

$$= \frac{EW_{GB}T_{GB}^3}{2L_{GB}^3 + 6R_{GB}^2 L_{GB} - 6R_{GB}L_{GB}^2}$$

For cases where load point 244 is not located at the midpoint of gimbal beams 248 one can show that gimbal tongue 247 will rotate when load point 244 is deflected out-of-plane. The distance to the instant center of rotation relative to load point 244 is the ratio of the expressions for deflection and slope and is as follows:

$$\text{Instant Center} = \frac{\text{Deflection}}{\text{Slope}}$$

$$= \frac{\frac{F}{EI}\left(R_{GB}L_{GB}^2 - \frac{L_{GB}^3}{3} - R_{GB}^2 L_{Gb}\right)}{\frac{F}{EI}\left(R_{GB}L_{Gb} - \frac{L_{GB}^2}{2}\right)}$$

$$= \frac{6R_{GB}L_{GB} - 2L_{GB}^2 - 6R_{GB}^2}{6R_{GB} - 3L_{GB}}$$

Figure 7:
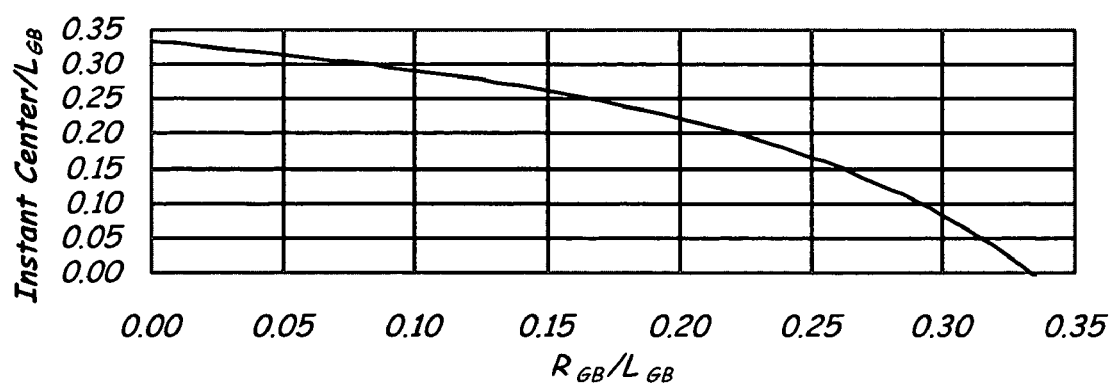
FIG. 7 illustrates a relationship between an instant center with respect to a length of gimbal beams and a distance from a load point to a free end with respect to a length of the gimbal beams.

In accordance with the equations describe above, if load point 244 were aligned with free-ends 254 of gimbal beams 248, the instant center of rotation would be located a distance from load point 244 two-thirds the length of gimbal beams 248; or, in other words, one-third the length of gimbal beams 248 relative to fixed-ends 256 of gimbal beams 248. If load point 244 were moved from free-ends 254 of gimbal beams 248, the instant center moves towards fixed-end 256 of the gimbal beams. If load point 244 were located one-third the length of gimbal beams 248 relative to free-end 254, the instant center would be aligned with fixed-end 256. If load point 244 were located more than one-third the length of the gimbal beams 248 relative to free-end 254, the instant center moves beyond fixed-ends 256 of the gimbal beams and into gimbal base 246. In FIG. 3, load point 244 is located less than one-third the length of gimbal beams 248 relative to free-ends 254. Therefore, in accordance with the equations described above, the instant center 258 would be located a distance from load point 244 two-thirds the length of gimbal beams 248 or less than one-third the length of the gimbal beams relative to the fixed ends 256. The relationship between instant center 258 with respect to the length ($L_{GB}$) of gimbal beams 248 and the distance ($R_{GB}$) from load point 244 to free end 254 with respect to the length ($L_{GB}$) of gimbal beam 248 is shown in FIG. 7.

To continue the trend in decreasing the size of the slider combined with the need for relatively long gimbal beams for improved gimbal flexibility, load point 244 of gimbal 234 can optimally be located from free-ends 254 of gimbal beams 248 a distance one-third or less than the length of the gimbal beams. Instant center 258, which is relative to the location of load point 244, can be optimally located from fixed-ends 256 a distance one-third or less the length of the gimbal beams.

Figure 8:
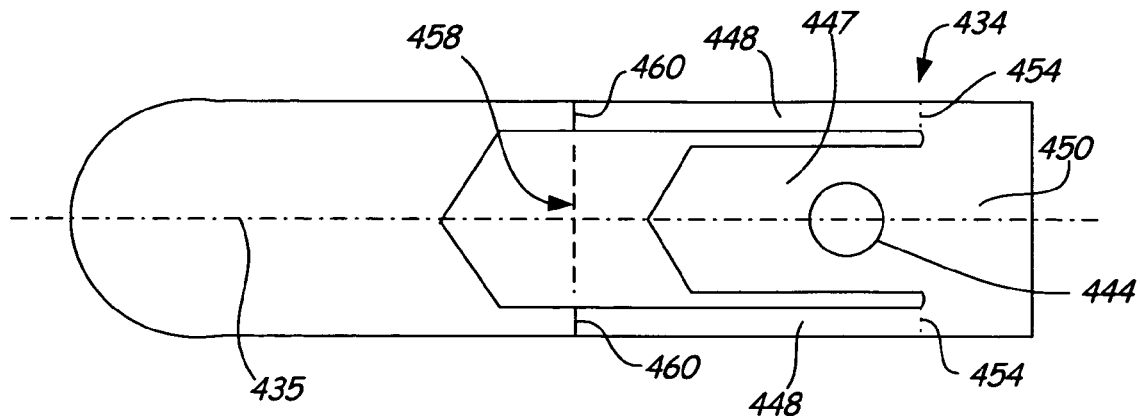
FIG. 8 illustrates a plan view of a gimbal in accordance with an embodiment of the present invention.

FIG. 8 illustrates a detailed plan view of a gimbal 434 in accordance with embodiments of the present invention. Gimbal 434 can be used in accordance with components of gimbal 234. Although gimbal 434 is illustrated as a separate component from a load beam it should be recognized that gimbal 434 can be integrally formed with a load beam as a single, continuous piece of material. In FIG. 8, increasing the load point contact force can be achieved by introducing a bend 460 across each gimbal beam 448 that is in alignment with the location of the instant center of rotation 458 of gimbal 434. Bends 460 are transverse to the length of the beams and a longitudinal axis 435 of gimbal 434, and are parallel with cross-beam 450. Instant center 458 of gimbal 434 is relative to load point 244. With this arrangement, variation in the bend angle will not result in variation in pitch static angle. In alternative embodiments, gimbal 434 can have any number of gimbal beams, and each beam can have a bend such as bend 460.

Figure 9:
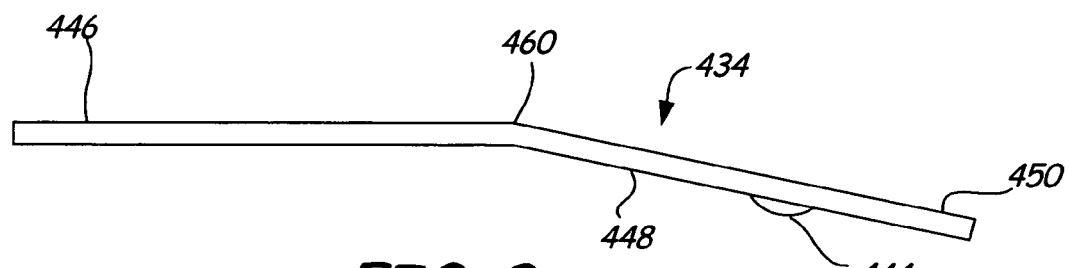
FIG. 9 illustrates a side view of the gimbal illustrated in FIG. 8 in accordance with an embodiment of the present invention.
Figure 10:
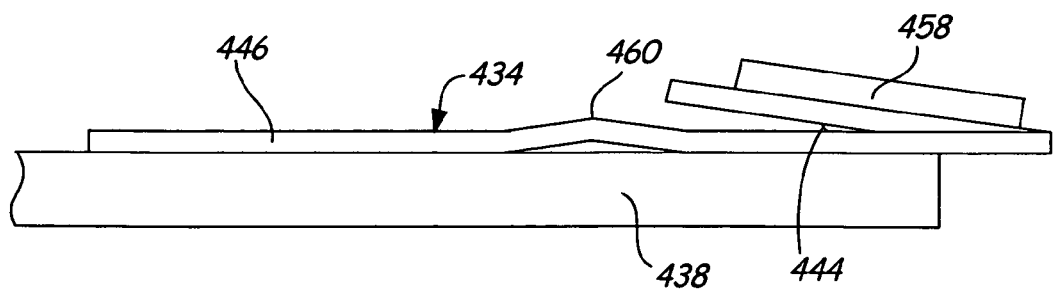
FIG. 10 illustrates a side view of the gimbal illustrated in FIG. 8 as assembled to components of a suspension assembly in accordance with an embodiment of the present invention.
Figures 1, 11:
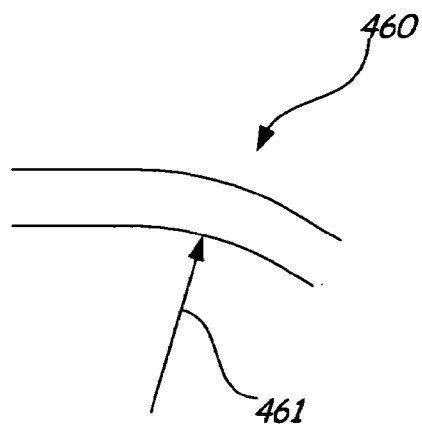
Figures 2, 11:
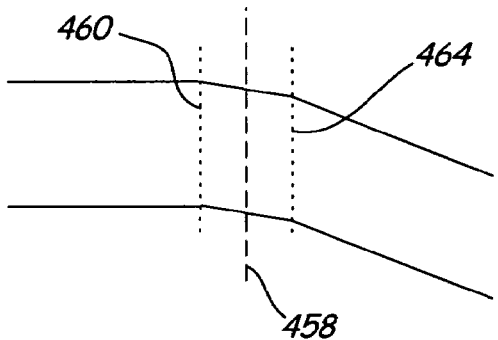

FIGS. 9 and 10 illustrate side views of gimbal 434 of FIG. 8. FIG. 9 illustrates a side view of gimbal 434 in a free state, prior to attachment to a load beam and a slider. As shown in FIG. 9, bends 460 displace the free ends 454 of beams 448 relative to a plane defined by the base 446 of gimbal 434. FIG. 10 illustrates a side view of gimbal 434 in an assembled state after it has been attached to a load beam 438 and a slider 458. As can be seen in FIG. 10, the pitch static angle of head 458, after attachment to load beam 438, is the same with transverse bend 460 is it would be without such a bend. In FIGS. 9 and 10, transverse bend 460 is illustrated as having a sharp angled bend. However, it should be noted that transverse bend 460 can have any cross-sectional shape and any suitable radius of curvature. For example, transverse bend 460 can have a radius of curvature 461 as illustrated in FIG. 11-1. In general, the radius of curvature 461 can be less than or equal to the product of elastic modulus E and a gimbal beam thickness divided by twice the yield strength $\sigma_{YIELD}$. However, other values for the radius of curvature 461 are possible. In another example, transverse bend 460 can include a pair of bends 462 and 464 equally spaced apart from instant center 458 as illustrated in FIG. 11-2.

For gimbals having gimbal beams with irregular sections, computer modeling, such as finite element analysis, may be helpful to understand the relationships of slope and deflection to loads applied on a load point. However, a transverse bend across an irregular section of gimbal beams is ideally located proximate to the instant center in an embodiment of the present invention. The distance to the instant center of rotation from the load point can be calculated from finite element results as follows:

$$\text{Instant Center} = \frac{\text{Out-of-plane deflection of the load point for a given force on the load point}}{\text{Change in gimbal tongue slope for a given force on the load point}}$$

By providing transverse bends 460 in gimbal beams 448 as illustrated in the FIGS. 8-10 embodiments, for example, one can significantly increase the load point contact force. Besides bends 460 being advantageous for positioning the slider relative to a medium, this is advantageous in that static attitude restoration processes can be located on gimbal beams 448 at locations other than on or near load point 444. In some instances transverse bend 460 allows for static attitude restoration processes to be performed anywhere along the length of the gimbal beam and still maintain sufficient load point contact force.

Figure 12:
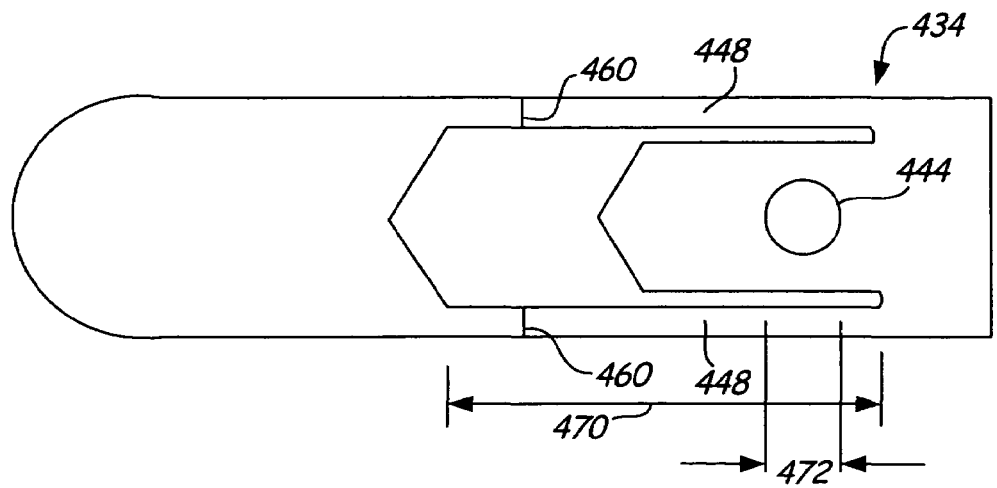
FIG. 12 illustrates a plan view of available space for performing restoration processes on a gimbal in accordance with the present invention.

Even though the one or more embodiments of the present invention provide for a wider range of candidate locations for static attitude restoration processes, the farther the restoration process is performed from load point 444 the greater the change in load point contact force. FIG. 12 is a plan view of gimbal 434 illustrating an available area 470 for static attitude restoration processes to take place when gimbal 434 includes transverse bend 460 compared to an available area 472 for static attitude restoration processes to take place without transverse bend 460. As illustrated in FIG. 12, available area 470 extends the length of gimbal beams 448. As illustrated in FIG. 12, available area 472 extends only the length of load point 444. Although care is still required in carrying out the static attitude restoration process, the margin of failure (i.e., load point separation) is substantially improved.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the gimbal while maintaining substantially the same functionality without departing from the scope and spirit of the present invention. In addition, although an embodiment described herein is directed to a gimbal for data storage system, it will be appreciated by those skilled in the art that the teachings of the present invention can be applied to other types of flexures, such as any flexure that supports one element relative to another in other data storage or non-data storage systems, without departing from the scope and spirit of the present invention. Also, the term "slider" can include a read and/or write head or other types of transducers in other non-data storage applications.

What is claimed is:

1. A flexure comprising:
   a longitudinal axis;
   a base centered about the longitudinal axis;
   a pair of beams coupled to the base at fixed-ends and joined by a cross-beam at free-ends of the beams, the pair of beams including a beam length parallel with the longitudinal axis and a beam width perpendicular to the longitudinal axis;
   a tongue extending from the cross beam, between the pair of beams towards the base, the tongue configured to couple to a slider and including a load point; and
   a bend positioned across each of the beam widths of each of the pair of beams, each bend displacing the free ends relative to the base.

2. The flexure of claim 1, wherein the tongue comprises a load point and each bend of the beams is in alignment with an instant center of rotation of the flexure relative to the load point.

3. The flexure of claim 2, wherein each bend of the beams is located at least as great as approximately ⅓ of a length of the beams relative to the fixed-ends.

4. The flexure of claim 3, wherein each bend of the beams is located ⅓ the length of the beams relative to the fixed ends.

5. The flexure of claim 2, wherein each bend comprises a pair of bends equally spaced apart from the instant center of rotation of the flexure.

6. The flexure of claim 1, wherein each bend comprises a single bend.

7. The flexure of claim 1, wherein each bend comprises a radius of curvature.

8. The flexure of claim 2, wherein the instant center of rotation of the flexure is a ratio of out-of-plane deflection of the load point for a given load force to a change in slope of the flexible tongue for the given load force.

9. The flexure of claim 1, wherein the flexure and a load member are formed as a continuous piece of material.

10. The flexure of claim 1, wherein the base is configured for attachment to a load member.

11. A suspension assembly comprising:
    a load member;
    a flexure coupled to the load member and comprising:
      a longitudinal axis;
      a base centered about the longitudinal axis;
      a pair of beams coupled to the base at fixed-ends and joined together by a cross-beam at free-ends of the beams, the pair of beams including a beam length running along the longitudinal axis and a beam width running transversely to the longitudinal axis;
      a tongue coupled to the cross-beam and extending between the pair of beams towards the base, the tongue including a load point in contact with the load member causing the tongue to be bent out-of-plane from a plane of the base and the pair of beams at the cross-beam;
    a slider coupled to the tongue; and
    a bend in each of the beams, positioned across the beam width of each of the first and second flexible beams, each bend displacing the free ends relative to the base.

12. The suspension assembly of claim 11, wherein the flexure and the load member are formed as a single, continuous piece of material.

13. The suspension assembly of claim 11, wherein the flexure is a separate piece of material attached to the load member.

14. The suspension assembly of claim 11, wherein the tongue comprises a load point and each bend of the beams is in alignment with an instant center of rotation of the flexure relative to the load point.

15. The suspension assembly of claim 14, wherein each bend of the beams is located at least as great as approximately ⅓ of a length of the beams relative to the fixed-ends.

16. The flexure of claim 15, wherein each bend of the beams is located ⅓ length of beams.

17. The suspension assembly of claim 14, wherein the instant center of rotation of the flexure is a ratio of out-of-plane deflection of the load point for a given load force applied to the flexure by the load member to a change in slope of the tongue for the load force.

18. An apparatus comprising:
    a longitudinal axis;
    a base centered about the longitudinal axis;
    first and second flexible beams coupled to the base at fixed-ends on opposing sides of the longitudinal axis and joined together at free ends opposite the fixed ends by a cross-beam that is transverse to the longitudinal axis;
    a tongue extending from the cross-beam along the longitudinal axis, between the beams and towards the base, the tongue including a load point; and
    a bend in each of the flexible beams extending transversely to the longitudinal axis and displacing the free ends relative to the base, wherein each bend in the pair of beams is in alignment with an instant center of rotation of the flexure relative to the load point.

19. The apparatus of claim 18, wherein the each bend of the beams is located at least as great as approximately ⅓ of a longitudinal length of the beams relative to the fixed-ends.

20. The apparatus claim 18, wherein the instant center of rotation of the flexure is a ratio of out-of-plane deflection of the load point for a given load force applied to the flexure by the load member to a change in slope of the tongue for the load force.

* * * * *